US012705278B2

(12) United States Patent
Huang et al.

(10) Patent No.: US 12,705,278 B2
(45) Date of Patent: Aug. 11, 2026

(54) LOGGING IMAGE DEFINITION RECOGNITION METHOD AND DEVICE, MEDIUM, AND ELECTRONIC EQUIPMENT

(71) Applicant: China Oilfield Services Ltd., Binhai New Area Tianjin (CN)

(72) Inventors: Lin Huang, Binhai New Area Tianjin (CN); Shusheng Guo, Binhai New Area Tianjin (CN); Zhenxue Hou, Binhai New Area Tianjin (CN); Chuan Fan, Binhai New Area Tianjin (CN); Danian Xu, Binhai New Area Tianjin (CN); Da Sheng, Binhai New Area Tianjin (CN); Wei Long, Binhai New Area Tianjin (CN); Guohua Zhang, Binhai New Area Tianjin (CN); Jiajie Cheng, Binhai New Area Tianjin (CN); Dong Li, Binhai New Area Tianjin (CN); Zhang Zhang, Binhai New Area Tianjin (CN); Lu Yin, Binhai New Area Tianjin (CN); Chaohua Zhang, Binhai New Area Tianjin (CN); Guibin Zhang, Binhai New Area Tianjin (CN)

(73) Assignee: China Oilfield Services Ltd., Tianjing (CN)

( * ) Notice: Subject to any disclaimer, the term of this patent is extended or adjusted under 35 U.S.C. 154(b) by 308 days.

(21) Appl. No.: 18/574,234

(22) PCT Filed: Oct. 19, 2021

(86) PCT No.: PCT/CN2021/124746
§ 371 (c)(1),
(2) Date: Dec. 26, 2023

(87) PCT Pub. No.: WO2023/273017
PCT Pub. Date: Jan. 5, 2023

(65) Prior Publication Data

US 2024/0143651 A1 May 2, 2024

(30) Foreign Application Priority Data

Jun. 29, 2021 (CN) ......................... 202110729473.5

(51) Int. Cl.
*G06V 10/00* (2022.01)
*G06F 16/51* (2019.01)
*G06F 16/583* (2019.01)

(52) U.S. Cl.
CPC ............ *G06F 16/583* (2019.01); *G06F 16/51* (2019.01)

(58) Field of Classification Search
CPC ........ G06V 10/82; G06V 10/85; G06V 10/25; G06V 10/761; G06V 10/762;
(Continued)

(56) References Cited

U.S. PATENT DOCUMENTS 7,480,674 B2 * 1/2009 Venguerov ............ G06Q 10/00 707/999.102
8,255,417 B2 * 8/2012 Nevill-Manning ..... G06F 17/00 707/706
(Continued)

FOREIGN PATENT DOCUMENTS

CN 110175980 A 8/2019
CN 111754491 A 10/2020
(Continued)

OTHER PUBLICATIONS

Ye et al., CN 109738955 A, “Metamorphic Rock Lithology Comprehensive Judgment Method Based OnComponent-structure Classification”, date published May 10, 2019.*
Dong et al., CN 111075440 A, “No Integrated Reservoir Scale Prediction Method And Device”, date published Apr. 28, 2020.*
(Continued)

*Primary Examiner* — Amir Alavi
(74) *Attorney, Agent, or Firm* — James E. Walton

(57) ABSTRACT

The present disclosure relates to the field of image definition recognition, and discloses a logging image definition rec-
(Continued)

ognition method and device, medium and electronic equipment. The method comprises: establishing a logging image sample library comprising a plurality of logging images; acquiring actual definition information corresponding to the respective logging images; acquiring a plurality of definitions corresponding to the respective logging images; determining target weights corresponding to the respective target image definition determination algorithms according to the plurality of definitions and the actual definition information corresponding to the respective logging images; and determining a definition of a target logging image by the respective target image definition determination algorithms and the target weights corresponding to the respective target image definition determination algorithms.

20 Claims, 5 Drawing Sheets

(58) Field of Classification Search
CPC ............... G06V 10/764; G06V 10/765; G06V 10/7715; G06V 10/774; G06F 16/583; G06F 16/51; G06F 16/532; G06F 18/214; E21B 2200/20; E21B 2200/22; E21B 47/002; E21B 47/00; E21B 49/00
See application file for complete search history.

(56) References Cited

U.S. PATENT DOCUMENTS

| | | | | |
|---|---|---|---|---|
| 8,478,739 | B1 * | 7/2013 | Hohwald | G06F 16/2453 707/723 |
| 8,671,120 | B1 * | 3/2014 | Bicknell | G06Q 10/08 707/804 |
| 9,936,237 | B2 * | 4/2018 | Jankins | H04N 21/435 |
| 9,946,762 | B2 * | 4/2018 | Allen | G06F 16/24578 |
| 10,984,296 | B2 * | 4/2021 | Besehanic | G06F 16/78 |
| 12,373,412 | B2 * | 7/2025 | Spruit | G06F 16/248 |
| 2010/0100729 | A1 | 4/2010 | Read | |
| 2020/0074588 | A1 * | 3/2020 | Fouda | G06F 16/587 |
| 2024/0143651 | A1 * | 5/2024 | Huang | E21B 49/00 |

FOREIGN PATENT DOCUMENTS

| | | |
|---|---|---|
| CN | 112950626 A | 6/2021 |
| CN | 113392241 A | 9/2021 |

OTHER PUBLICATIONS

International Search Report dated Mar. 7, 2022 for Parent PCT Appl. No. PCT/CN2021/124746.

Written Opinion of the International Searching Authority for Parent PCT Appl. No. PCT/CN2021/124746.

First Office Action from Chinese Appl. No. 202110729473.5.

First Search Report from Chinese Appl. No. 202110729473.5.

* cited by examiner

LOGGING IMAGE DEFINITION RECOGNITION METHOD AND DEVICE, MEDIUM, AND ELECTRONIC EQUIPMENT

CROSS REFERENCE TO RELATED APPLICATIONS

The present application is a U.S. National-Stage application under 35 U.S.C, 371 of Int'l Appl. No. PCT/CN2021/124746 filed on 19 Oct. 2021 entitled "Method for Identifying Clarity of Well Logging Image, Apparatus, Medium, and Electronic Device", and claims priority to Chinese Patent Application No. 202110729473.5 filed with the China Patent Office on 29 Jun. 2021 entitled "Logging Image Definition Recognition Method and Device, Medium, and Electronic Equipment", the entire contents of both of which are incorporated herein by reference for all purposes.

TECHNICAL FIELD

The present disclosure relates to the technical field of image definition recognition, and in particular to a logging image (well-logging image) definition recognition method and device, medium, and electronic equipment.

BACKGROUND

Usually, for a particular imaging system, the definition of the imaging thereof reflects the focusing state of the system. When the focusing effect is better, the image is presented more clearly with rich information such as contour details, highlighting different feature information in the spatial domain or the frequency domain. For example, in the spatial domain, the gray value of the image serves as the main feature information; in the frequency domain, the feature information is a high-frequency component. The image focusing evaluation function (Focus Value) is usually utilized to measure whether the image is in a focused state or not.

When the focused state of the image is better, the image is sharper, which is expressed in the spatial domain as more drastic changes in the characteristic values of the adjacent pixel points of the image, such as the gray values, the contrasts, and the like. When an image is in a defocused state, much of the information of the details is lost, which makes the imaging of the object blurry. Different definition recognition methods differ in processing different blurred images, and there are conditional limitations on the images to be recognized. For example, when the entropy function is utilized for recognition, it places emphasis on the uniform arrangement of points in the picture. If a picture with only black and white stripes is compared with a picture that is blurred but has a lot of black dots on it, then the sharp picture obtained by the entropy function as the recognition method is the blurred picture, which is obviously contrary to the fact and does not bring the correct recognition result.

SUMMARY

In order to solve the above technical problem in the technical field of image definition recognition, the present disclosure provides a logging image definition recognition method and device, medium and electronic equipment.

According to an aspect of the present disclosure, there is provided a logging image definition recognition method, which includes:

establishing a logging image sample library including a plurality of logging images;

acquiring actual definition information corresponding to the respective logging images, the actual definition information being an actual definition sorting sequence number or an actual normalized definition;

acquiring a plurality of definitions corresponding to the respective logging images, the plurality of definitions being generated by a plurality of target image definition determination algorithms respectively performing definition calculations on the logging images;

determining target weights corresponding to the respective target image definition determination algorithms according to the plurality of definitions and the actual definition information corresponding to the respective logging images; and determining a definition of a target logging image by the respective target image definition determination algorithms and the target weights corresponding to the respective target image definition determination algorithms.

Optionally, the determining the target weights corresponding to the respective target image definition determination algorithms according to the plurality of definitions and the actual definition information corresponding to the respective logging images includes:

establishing definition vectors corresponding to the respective logging images by the plurality of definitions corresponding to the respective logging images, the definition vectors including normalized definitions corresponding to the respective target image definition determination algorithms;

initializing a weight vector, the weight vector including weights corresponding to the respective target image definition determination algorithms;

constructing a plurality of training units by the weight vector and the definition vectors corresponding to the respective logging images, each of the training units comprising definition vectors corresponding to two logging images respectively and the weight vector;

executing a weight adjustment step, the weight adjustment step comprising: for each of the training units, comparing elements in the definition vectors in each of the training units, and adjusting weights of the weight vector in the training units according to the comparison results;

determining an average of the weight vector in the respective training units to obtain a final weight vector;

calculating and obtaining final definitions corresponding to the respective logging images by the final weight vector and the definition vectors corresponding to the respective logging images;

determining whether the final definitions corresponding to the respective logging images match the actual definition information corresponding to the respective logging images;

if yes, utilizing the weights in the final weight vector as the target weights corresponding to the respective target image definition determination algorithms, otherwise executing the weight adjustment step and subsequent steps until the final definitions corresponding to the respective logging images match the actual definition information corresponding to the respective logging images.

Optionally, the training units include a first definition vector and a second definition vector, the weight adjustment step further includes:

if a number, in which elements in the first definition vector are greater than corresponding elements in the second definition vector, is more than half of a total number of elements in the first definition vector or the second definition vector, then increasing the respective target weights in the weight vector or decreasing respective non-target weights in the weight vector, until the sum of the products of the weight vector and corresponding elements in the first definition vector is greater than the sum of the products of the weight vector and corresponding elements in the second definition vector, wherein the elements in the first definition vector that are larger than the corresponding elements of the second definition vector correspond to the target image definition determination algorithms corresponding to the target weights, and the non-target weights are weights in the weight vector other than the target weights.

Optionally, the actual definition information is an actual definition sorting sequence number, and the determining whether the final definitions corresponding to the respective logging images matches the actual definition information corresponding to the respective logging images includes:

sorting the final definitions corresponding to the respective logging images to obtain a final definition sorting sequence numbers corresponding to the respective logging images;

if, for any logging image, the final definition sorting sequence number corresponding to that logging image is consistent with the actual definition sorting sequence number corresponding to that logging image, then determining that the final definitions corresponding to the respective logging images match the actual definition information corresponding to the respective logging images, otherwise determining that the final definitions corresponding to the respective logging images do not match the actual definition information corresponding to the respective logging images.

Optionally, before acquiring the plurality of definitions corresponding to the respective logging images, the method further includes:

for each logging image in the logging image sample library, respectively determining definitions of that logging image by a plurality of image definition determination algorithms;

selecting a plurality of target image definition determination algorithms among the plurality of image definition determination algorithms according to the definitions determined by a plurality of image definition determination algorithms and the actual definition sorting sequence numbers corresponding to the respective logging images.

Optionally, the establishing the logging image sample library including the plurality of logging images includes:

acquiring unrepaired logging images and repaired logging images corresponding to the respective unrepaired logging images;

establishing the logging image sample library by the unrepaired logging images and the repaired logging images.

Optionally, the plurality of target image definition determination algorithms include one or more of the following algorithms: a Brenner algorithm, a Tenengrad algorithm, a Laplacian algorithm, an SMD algorithm, an SMD2 algorithm, a variance algorithm, an energy algorithm, a Vollath algorithm.

According to another aspect of the present disclosure, there is provided a logging image definition recognition device, which includes:

an establishment module configured to establish a logging image sample library including a plurality of logging images;

a first acquisition module configured to acquire actual definition information corresponding to the respective logging images, the actual definition information being an actual definition sorting sequence number or an actual normalized definition;

a second acquisition module configured to acquire a plurality of definitions corresponding to the respective logging images, the plurality of definitions being generated by a plurality of target image definition determination algorithms respectively performing definition calculations on the logging images;

a target weight determination module configured to determine target weights corresponding to the respective target image definition determination algorithms according to the plurality of definitions and the actual definition information corresponding to the respective logging images; and a definition determination module configured to determine a definition of a target logging image by the respective target image definition determination algorithms and the target weights corresponding to the respective target image definition determination algorithms.

According to another aspect of the present disclosure, there is provided an electronic equipment, which includes: a processor;

a memory, on which computer-readable instructions are stored, the computer-readable instructions, when executed by the processor, implementing the following operations:

establishing a logging image sample library including a plurality of logging images;

acquiring actual definition information corresponding to the respective logging images, the actual definition information being an actual definition sorting sequence number or an actual normalized definition;

acquiring a plurality of definitions corresponding to the respective logging images, the plurality of definitions being generated by a plurality of target image definition determination algorithms respectively performing definition calculations on the logging images;

determining target weights corresponding to the respective target image definition determination algorithms according to the plurality of definitions and the actual definition information corresponding to the respective logging images; and determining a definition of a target logging image by the respective target image definition determination algorithms and the target weights corresponding to the respective target image definition determination algorithms.

According to further another aspect of the present disclosure, there is provided a non-volatile computer-readable storage medium, in which at least one executable instruction is stored, and the executable instruction causes a processor to execute the following operations:

establishing a logging image sample library including a plurality of logging images;

acquiring actual definition information corresponding to the respective logging images, the actual definition information being an actual definition sorting sequence number or an actual normalized definition;

acquiring a plurality of definitions corresponding to the respective logging images, the plurality of definitions being generated by a plurality of target image definition determination algorithms respectively performing definition calculations on the logging images;

determining target weights corresponding to the respective target image definition determination algorithms according to the plurality of definitions and the actual definition information corresponding to the respective logging images; and determining a definition of a target logging image by the respective target image definition determination algorithms and the target weights corresponding to the respective target image definition determination algorithms.

According to yet another aspect of the present disclosure, there is further provided a computer program product including a computing program stored on the above non-volatile computer-readable storage medium.

The technical solutions provided by embodiments of the present disclosure may include the following beneficial effects:

The disclosure provides the logging image definition recognition method and device, medium and electronic equipment, and the method includes the following steps: establishing a logging image sample library including a plurality of logging images; acquiring actual definition information corresponding to the respective logging images, the actual definition information being an actual definition sorting sequence number or an actual normalized definition; acquiring a plurality of definitions corresponding to the respective logging images, the plurality of definitions being generated by a plurality of target image definition determination algorithms respectively performing definition calculations on the logging images; determining target weights corresponding to the respective target image definition determination algorithms according to the plurality of definitions and the actual definition information corresponding to the respective logging images; and determining a definition of a target logging image by the respective target image definition determination algorithms and the target weights corresponding to the respective target image definition determination algorithms.

With this method, by firstly determining target weights corresponding to the respective target image definition determination algorithms according to the plurality of definitions and the actual definition information corresponding to the respective logging images, and then determining the definition of a target logging image by the target weights corresponding to the respective target image definition determination algorithms and the respective target image definition determination algorithms, and by synthesizing the different advantages of the plurality of image definition determination algorithms, a method capable of accurately recognizing the definition of the logging image is formed, and accurate quantification of the definition of the logging image can be realized.

It should be appreciated that the above general description and the detailed description that follows are merely exemplary and do not limit the present invention.

BRIEF DESCRIPTION OF THE DRAWINGS

The accompanying drawings herein are incorporated into and form a part of the specification, illustrate embodiments in accordance with the present invention, and are used in conjunction with the description to explain the principle of the present invention.

DETAILED DESCRIPTION

Exemplary embodiments will be described in detail here, examples of which are represented in the accompanying drawings. When the following description relates to the accompanying drawings, the same numerals in the different accompanying figures indicate the same or similar elements, unless otherwise indicated. The implementations described in the following exemplary embodiments do not represent all implementations consistent with the present invention. Rather, they are merely examples of devices and methods that are consistent with some aspects of the present invention as detailed in the appended claims.

Furthermore, the accompanying drawings are only schematic illustrations of the present disclosure and are not necessarily drawn to scale. The same reference signs in the figures indicate identical or similar portions, and thus repeated descriptions of them will be omitted. Some of the block diagrams shown in the accompanying drawings are functional entities and do not necessarily have to correspond to physically or logically independent entities.

The present disclosure first provides a logging image definition recognition method. Logging images are image data generated through well-logging technology. For example, the logging images can be generated with acoustic-electric imaging technology. Logging image definition recognition refers to determining corresponding definitions according to the logging images, and different logging images generally have different definitions; when the focusing situation of one logging image is poor, the definition of that logging image is low.

An implementation terminal of the present disclosure may be any equipment having computing, processing, and communication functions. The equipment may be connected to external equipment for receiving or sending data, specifically may be portable mobile equipment, such as a smartphone, a tablet, a laptop, a PDA (Personal Digital Assistants), and the like, or may also be a stationary equipment, for example a computer equipment, a field terminal, a desktop computer, a server, a workstation and the like, or may also be a collection of a plurality of equipment, such as a cluster of servers or a physical infrastructure for cloud computing.

Optionally, an implementation terminal of the present disclosure may be a server or a physical infrastructure for cloud computing.

Figure 1:
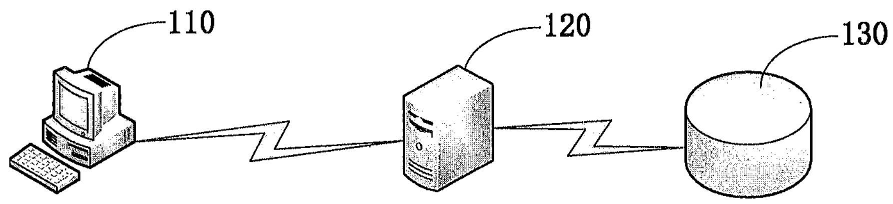
FIG. 1 is a schematic diagram of a system architecture of a logging image definition recognition method illustrated according to an exemplary embodiment.

FIG. 1 is a schematic diagram of a system architecture of a logging image definition recognition method illustrated according to an exemplary embodiment. As shown in FIG. 1, the system architecture includes a personal computer 110, a server 120, and a database 130, and the personal computer 110 and the server 120, and the database 130 and the server 120 are connected through communication links that may be used to send or receive data. The server 120 is the implementation terminal in the present embodiment, logging images and corresponding actual definition information are stored in the database 130, and the logging images to be recognized are stored on the personal computer 110.

When the logging image definition recognition method provided by the present disclosure is applied to the system architecture shown in FIG. 1, one procedure may be as follows. The server 120 acquires the logging images and the corresponding actual definition information from database 130; and then respective target image definition determination algorithms and corresponding target weights are determined on the basis of image definition determination algorithms, the logging images and the corresponding actual definition information; finally, after the server 120 acquires the logging image to be recognized from the personal computer 110, the definition of the logging image to be recognized is calculated by utilizing the respective target image definition determination algorithms and the corresponding target weights.

Figure 2:
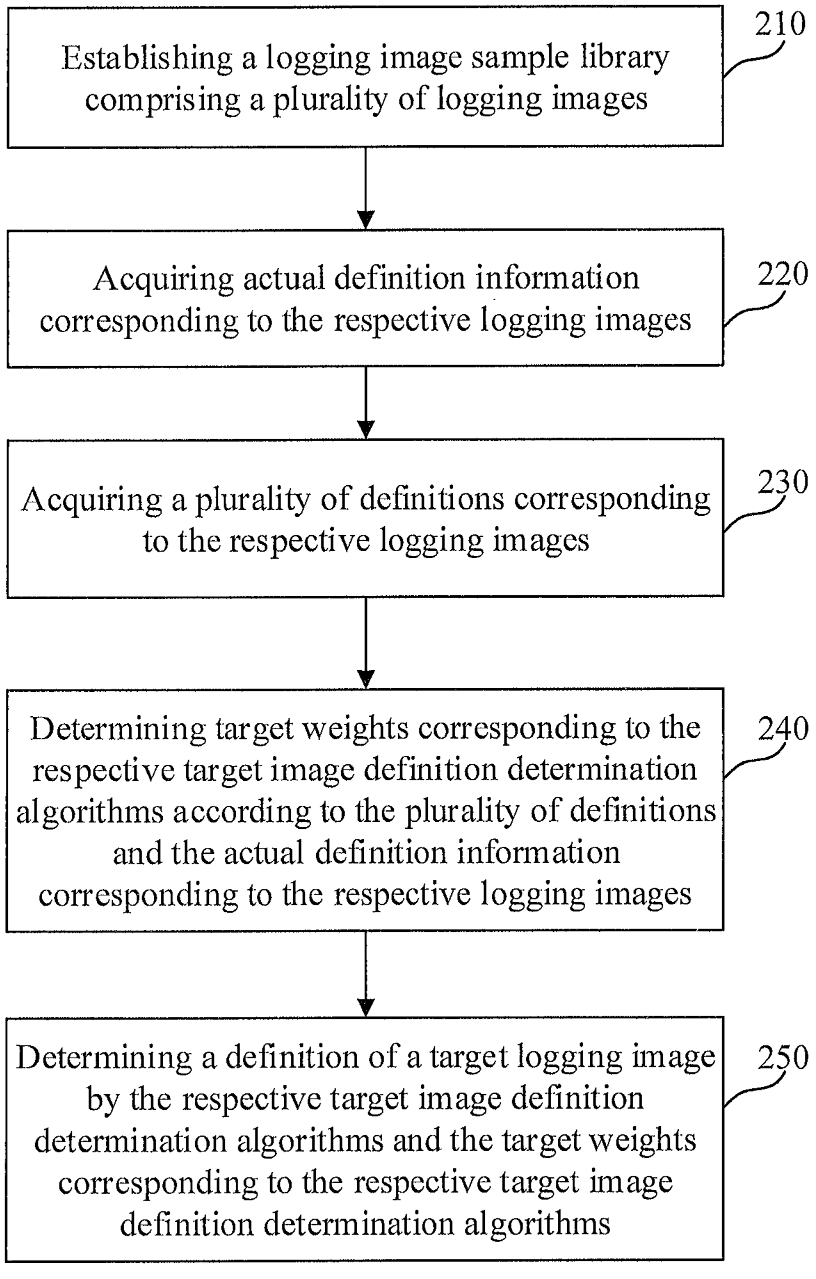
FIG. 2 is a flowchart of a logging image definition recognition method illustrated according to an exemplary embodiment.

FIG. 2 is a flowchart of a logging image definition recognition method illustrated according to an exemplary embodiment. The logging image definition recognition method provided by the present embodiment may be executed by a server, as shown in FIG. 2, and includes the following steps 210 to 250.

Step 210, establishing a logging image sample library including several logging images.

Figure 3:
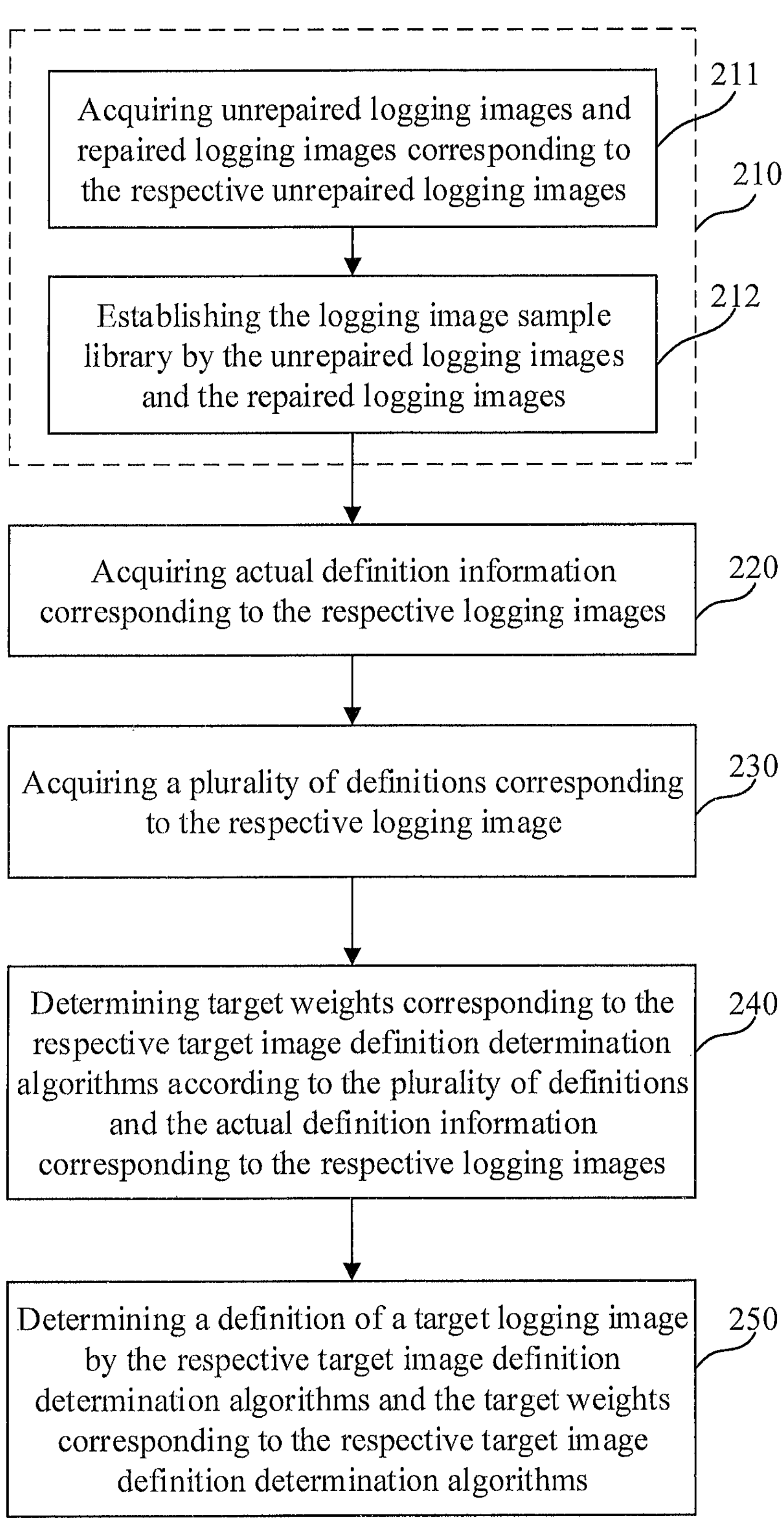
FIG. 3 is a flowchart of the details of the step 210 of an embodiment illustrated according to the embodiment of FIG. 2.

In one embodiment, the specific steps of the step 210 are shown in FIG. 3. FIG. 3 is a flowchart of the details of the step 210 of an embodiment illustrated according to the embodiment of FIG. 2. As shown in FIG. 3, the step 210 includes the following steps 211 to 212.

Step 211, acquiring unrepaired logging images and repaired logging images corresponding to the respective unrepaired logging images.

Many original unrepaired logging images have a defect of incompleteness, and repair of the unrepaired logging images manually can obtain the repaired logging images.

Step 212, establishing the logging image sample library on the basis of the unrepaired logging images and the repaired logging images.

The logging image sample library includes both the unrepaired logging images and the repaired logging images, thus enriching the number of the logging images in the logging image sample library, and thus providing data support for accurately recognizing the definition of the logging images.

Step 220, acquiring actual definition information corresponding to the respective logging images.

The actual definition information is an actual definition sorting sequence number or an actual normalized definition.

The actual definition sorting sequence number is a sequence number labeled after manually identifying the definitions of the respective logging images and sorting the respective logging images in an order of the definitions from largest to smallest or from smallest to largest.

The actual normalized definition is a value obtained by manually quantifying the respective logging images within the same quantization interval that is usually [0, 1].

Step 230, acquiring a plurality of definitions corresponding to the respective logging image.

The plurality of definitions are generated by a plurality of target image definition determination algorithms respectively performing definition calculations on the logging images.

In one embodiment, the plurality of target image definition determination algorithms include one or more of the following algorithms: a Brenner algorithm, a Tenengrad algorithm, a Laplacian algorithm, an SMD algorithm, an SMD2 algorithm, a variance algorithm, an energy algorithm, a Vollath algorithm.

Each of the above-described algorithms can be used to calculate the definition of an image.

In one embodiment, before acquiring the plurality of definitions corresponding to each logging image, the method further includes:

- for each logging image in the logging image sample library, respectively determining the definition of a logging image by utilizing a plurality of image definition determination algorithms;
- selecting a plurality of target image definition determination algorithms among the plurality of image definition determination algorithms according to the definitions corresponding to the respective logging images and the actual definition sorting sequence numbers.

The number of the target image definition determination algorithms is smaller than the number of the image definition determination algorithms. For example, the number of the target image definition determination algorithms may be 5, while the number of the image definition determination algorithms may be 8. For example, the plurality of target image definition determination algorithms, may be the 8 algorithms in the embodiment.

In the present embodiment, by removing a portion of the image definition determination algorithms that are not suitable for recognizing the definition of the logging image, it is ensured that accurate recognition of the definition of the logging image can be achieved in the subsequent procedure.

In one embodiment, the selecting a plurality of target image definition determination algorithms among the plurality of image definition determination algorithms according to the definitions corresponding to the respective logging images and the actual definition sorting sequence numbers includes:

- as for each image definition determination algorithm, acquiring definition sorting sequence numbers of the respective logging images corresponding to the image definition determination algorithm;
- as for each image definition determination algorithm, among the definition sorting sequence numbers of the respective logging images corresponding to that image definition determination algorithm, determining a ratio of the number of the definition sorting sequence numbers that are consistent with the actual definition sorting sequence numbers to the number of the definition sorting sequence numbers of all logging images corresponding to that image definition determination algorithm;
- removing at least one image definition determination algorithm of the plurality of image definition determination algorithms according to the ratio corresponding to the respective image definition determination algorithms, to obtain the plurality of target image definition determination algorithms, wherein the ratio corresponding to the removed image definition determination algorithms is smaller than the ratio corresponding to the target image definition determination algorithms.

By utilizing the same image definition determination algorithm, the definitions corresponding to the respective logging images can be determined, and thus one image definition determination algorithm has one corresponding definition sorting, and accordingly also has a definition sorting sequence number of the respective logging images. Thus a logging image has a corresponding definition sorting sequence number, and also a corresponding actual definition sorting sequence number. The definition sorting sequence number corresponding to one logging image and the actual definition sorting sequence number corresponding to the one logging image may, be the same or different.

The ratio reflects the consistency between the ranking of the definitions calculated by one image definition determination algorithm for the respective logging images and the ranking of the actual definitions corresponding to the respective logging images.

If the ratio corresponding to one image definition determination algorithm is lower, it shows that the image definition determination algorithm is less suitable for calculating the definition of the logging image.

Step 240, determining target weights corresponding to the respective target image definition determination algorithms according to the actual definition information and the plurality of definitions corresponding to the respective logging images.

In one embodiment, the determining the target weights corresponding to the respective target image definition determination algorithms according to the plurality of definitions and the actual definition information corresponding to the respective logging images includes:

establishing definition vectors corresponding to the respective logging images by utilizing the plurality of definitions corresponding to the respective logging images, the definition vectors including normalized definitions corresponding to the respective target image definition determination algorithms;

initializing a weight vector, the weight vector including weights corresponding to the respective target image definition determination algorithms;

constructing a plurality of training units by utilizing the weight vector and the definition vectors corresponding to the respective logging images, each of the training units including definition vectors corresponding to two logging images respectively and the weight vector;

executing a weight adjustment step, the weight adjustment step including: for each of the training units, comparing elements in the definition vectors in each of the training units and adjusting weights of the weight vector in the training units according to the comparison results;

determining an average of the weight vectors in the respective training units to obtain a final weight vector; calculating and obtaining final definitions corresponding to the respective logging images by utilizing the final weight vector and the definition, vectors corresponding to the respective logging images;

determining whether the final definitions corresponding to the respective logging images match the actual definition information corresponding to the respective logging images; if yes, utilizing the weights in the final weight vector as the target weights corresponding to the respective target image definition determination algorithms, otherwise executing the weight adjustment step and subsequent steps until the final definitions corresponding to the respective logging images match the actual definition information corresponding to the respective logging images.

The definition corresponding to one target image definition determination algorithm is normalized in the following way:

determining the maximum and the minimum values of the definitions corresponding to the respective logging images and acquired by one target image definition determination algorithm; for the definition corresponding to one logging image and acquired by the one target image definition determination algorithm, calculating the ratio of the difference between that definition and the minimum value to the difference between that maximum value and the minimum value as the normalized definition.

In one embodiment, the training units include a first definition vector and a second definition vector the step that for each of the training units comparing elements in the definition vectors in the training units that correspond to the respective logging images and adjusting weights of the weight vector in the training units according to the comparison results includes:

if the number in which elements in the first definition, vector are greater than corresponding elements in the second definition vector, is more than half of the total number of elements in the first definition vector or the second definition vector, then increasing the respective target weights in the weight vector or decreasing respective non-target weights in the weight vector, until the sum of the products of the weight vector and corresponding elements in the first definition vector is greater than the sum of the products of the weight vector and corresponding elements in the second definition vector, wherein the elements in the first definition vector that are larger than the corresponding elements of the second definition vector correspond to the target image definition determination algorithms corresponding to the target weights, and the non-target weights are weights in the weight vector other than the target weights.

In one embodiment, the actual definition information is an actual definition sorting sequence number. The step that determining whether the final definitions corresponding to the respective logging images match the actual definition information corresponding to the respective logging images includes:

sorting the final definitions corresponding to the respective logging images to obtain a final definition sorting sequence numbers corresponding to the respective logging images;

if, for any logging image, the final definition sorting sequence number corresponding to that logging image is consistent with the actual definition sorting sequence number corresponding to that logging image, then determining that the final definitions corresponding to the respective logging images match the actual definition information corresponding to the respective logging images, otherwise, determining that the final definitions corresponding to the respective logging images do not match the actual definition information corresponding to the respective logging images.

In one embodiment, the actual definition information is an actual normalized definition. The step that determines whether the final definitions corresponding to the respective logging images match the actual definition information corresponding to the respective logging images includes:

as for each logging image, determining a difference between the final definition corresponding to that logging image and the actual normalized definition corresponding to that logging image;

determining the variance of the differences corresponding to the respective logging images;

if the variance is smaller than a predetermined variance threshold, then determining that the final definitions corresponding to the respective logging images match the actual definition information corresponding to the respective logging images, otherwise, determining that the final definitions corresponding to the respective logging images do not match the actual definition information corresponding to the respective logging images.

The steps in the above-described embodiments will be further explained below by way of one specific example.

Firstly, a logging image sample library is established.

Next, the definitions of the logging images will be calculated by eight algorithms, respectively, and the consistency of the ranking of the definitions calculated by the respective algorithms for the respective logging images with the ranking of the actual definitions corresponding to the respective logging images will be determined, and that algorithm with lower consistency will be removed, and 5 algorithms will be obtained.

Then, a definition matrix X={$X_i$}, j∈⌊1, 5⌋ will be established by a plurality of definitions corresponding to the respective logging images, where $X_j$ is the vector consisting of the normalized definitions for the respective logging images that corresponds to the jth algorithm and is the column vector of the definition matrix X; the definition matrix X further includes row vectors, and one row vector includes the normalized definitions for the same logging image that corresponds to the respective algorithms, for example, the row vectors may be:

$$X_i=\{x_{i1},x_{i2},x_{i3},x_{i4},x_{i5}\} i\in[1,N],$$

where $X_i$ are the normalized definitions for the ith logging image that corresponds to the respective algorithms, and N is the number of the logging images.

Next, the weight vector will be initialized: A={$a_1$, $a_2$, $a_3$, $a_4$, $a_5$} where A is the weight vector, the elements in A are the weights corresponding to the respective algorithms, and the initialized value is 0.2;

Next, a set U including a plurality of training units Will be constructed by the definition vectors corresponding to the N logging images, and one training unit will be generated by the definition vectors corresponding to every two logging images respectively, and thus $$\frac{N(N\ \ 1)}{2}$$

training units can be generated, and each training unit is $U_i$={$X_a$, $X_b$, $A_i$}, where a≠b, a∈[1,N], b∈[1,N], i∈[1,N(N−1)/2], $X_a$ and $X_b$ are definition row vectors of two images A, B in $U_i$, respectively, $A_i$ is a vector of weight coefficients for the current training unit, and $$\sum_{j-1}^{5} a_{ij} = 1,$$

that is, the sum of the weights corresponding to the respective algorithms is 1;

Then, by taking $U_i$ as the basic unit, and by comparing $X_a$ and $X_b$, the $A_i$ obtained from this training will be determined. Specifically: $X_a$ and $X_b$ will be compared, and if the majority of the algorithms recognize that image A has higher definition, the weights of the corresponding several algorithms will be increased or the weights of the several others will be decreased, and the weights will be normalized after adjustment, until $x_{am}>x_{bm}$, where $x_{am}$ where $x_{am}$ is the sum of the products of the corresponding elements in $X_a$ and $A_i$, and $x_{bm}$ is the sum of the products of the corresponding elements in $X_b$ and $A_i$;

N(N−1)/2 weight vectors will be generated in total after completing the training of all training units, and then the final weight vector $A_{mean}$ will be obtained by averaging over all the weight vectors;

By substituting the final weight vector into the following equation, the following matrix consisting of the final definitions of logging images can be obtained:

$$X_m=XA;$$

The sorting situation of the definitions of the respective logging images reflects the trend of change in definition. If the final trend of change in definition of the respective logging images calculated and obtained by the final, weight vectors is consistent with the actual trend of change in definition, then it indicates that the final weight vector can be used for the final calculation of the definition of the logging image, otherwise the step for adjusting the weights will be continued to be executed. And the weights that correspond to the respective algorithms and that can be used to accurately calculate the definitions of the logging images can be obtained in the end.

Step 250, determining a definition of a target logging image by the respective target image definition determination algorithms and the target weights corresponding to the respective target image definition determination algorithms.

The target logging image is the logging image to be recognized for definition. The definitions of the target logging images is first recognized respectively by utilizing the respective target image definition determination, algorithms, and the definitions corresponding to the respective target image definition determination algorithms are normalized, and then the respective normalized definitions are multiplied with the target weights of the corresponding target image definition determination algorithms, respectively, and then the respective products are summed up to finally obtain the definition of the target logging image.

In summary, according to the logging image definition recognition method provided by the embodiment of FIG. 2, by firstly determining target Weights corresponding to the respective target image definition determination algorithms according to the plurality of definitions and the actual definition information corresponding to the respective logging images, and then determining the definition of a target logging image by utilizing the target weights corresponding to the respective target image definition determination algorithms and the respective target image definition determination algorithms, and by synthesizing the different advantages of the plurality of image definition determination algorithms, a method capable of accurately recognizing the definition of the logging image is formed, and accurate quantification of the definition of the logging image can be realized.

The present disclosure further provides a logging image definition recognition device, and the following is a device embodiment of the present disclosure.

Figure 4:
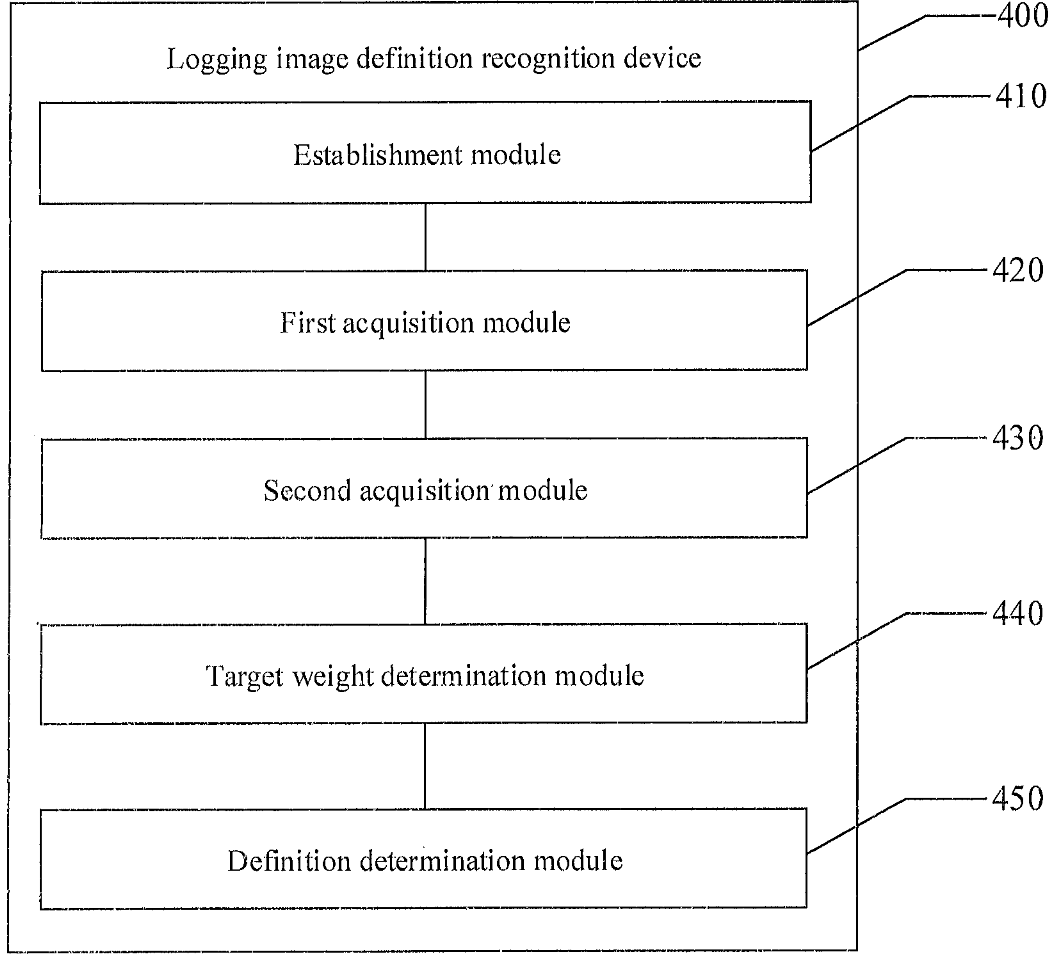
FIG. 4 is a block diagram of a logging image definition recognition device illustrated according to an exemplary embodiment.

FIG. 4 is a block diagram of a logging image definition recognition device illustrated according to an exemplary embodiment. As shown in FIG. 4, the device 400 includes:

an establishment module 410 configured to establish a logging image, sample library including a plurality of logging images;

a first acquisition module 420 configured to acquire actual definition information corresponding to the respective logging images, the actual definition information being an actual, definition sorting sequence number or the actual normalized definition;

a second acquisition module 430 configured to acquire a plurality of definitions corresponding to the respective logging images, the plurality of definitions being generated by a plurality of target image definition determination algorithms respectively performing definition calculations on the logging images;

a target weight determination module 440 configured to determine target weights corresponding, to the respective target image definition determination algorithms according to the plurality of definitions and the actual definition information corresponding to the respective logging images; and a definition determination module 450 configured to determine a definition of a target logging image by the respective target image definition determination algorithms and the target weights corresponding to the respective target image definition determination algorithms.

According to a third aspect of the present disclosure, there is also provided an electronic equipment capable of implementing the method described above.

Those skilled in the art to which it belongs will be able to understand that the respective aspects of the present invention may be realized as a system, a method, or a program product. Therefore, the respective aspects of the present invention may be specifically realized in the following form, that is: a complete hardware implementation, a complete software implementation (including firmware, microcode and the like) or an implementation with combination of hardware and software aspects, which may be collectively referred to herein as “circuit”, “module”, or “system”.

An electronic equipment 500 according to this embodiment of the present invention will be described below with reference to FIG. 5. The electronic equipment 500 shown in FIG. 5 is merely one example and should not impose any limitations on the functionality and scope of use of the embodiments of the present invention.

Figure 5:
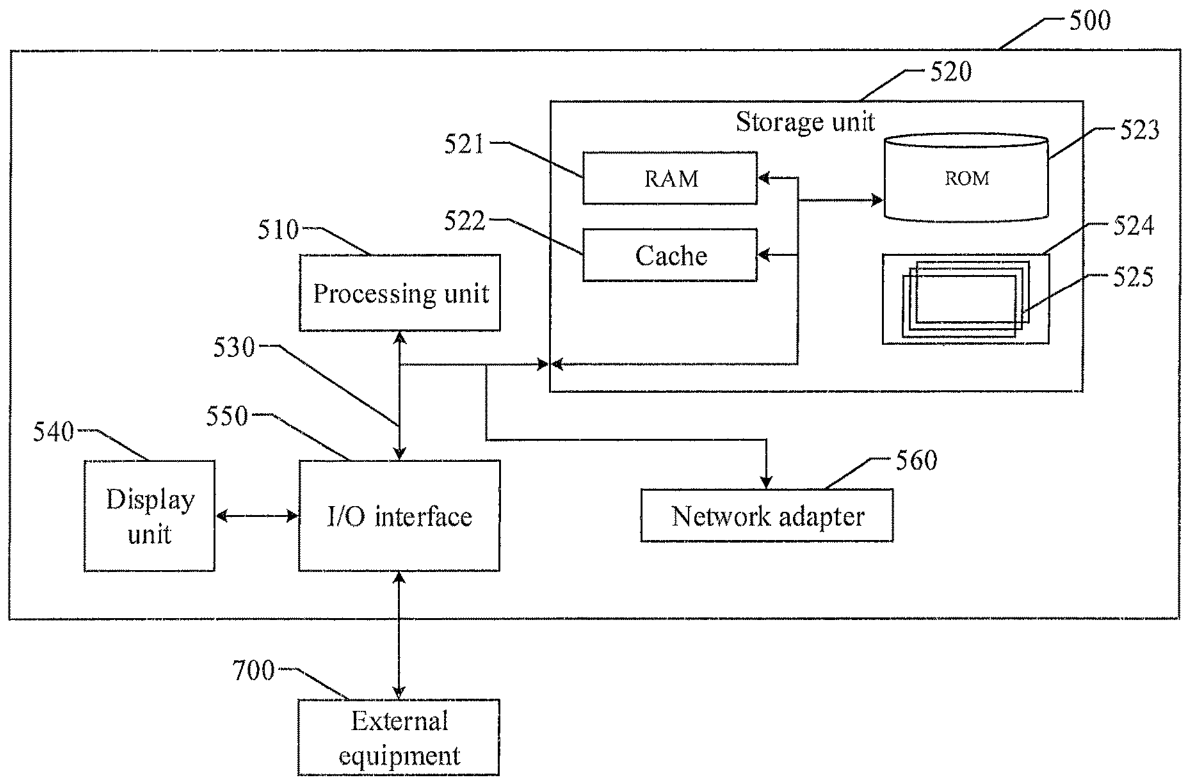
FIG. 5 is an example block diagram of an electronic equipment implementing the above-described logging image definition recognition method illustrated according to an exemplary embodiment.

As shown in FIG. 5, the electronic equipment 500 is presented in the form of a general-purpose computing equipment. Components of the electronic equipment 500 may include, but are not limited to: the at least one processing unit 510 described above, the at least one storage unit 520 described above, a bus 530 connecting different system components (including the storage unit 520 and the processing unit 510).

Wherein a program code stored in the storage, unit, and the program code can be executed by the processing unit 510 to cause the processing unit 510 to execute the steps according to various exemplary embodiments of the present invention as described in the above-described “Example Methods” section of the present specification.

The storage unit 520 may include a readable medium in the form of a volatile storage unit, such as a random access memory unit (RAM) 521 and/or a cache memory unit 522, and may further include a read-only memory unit (ROM) 523.

The storage unit 520 may further include a program/utility 524 having a group of (at least one) program modules 525. Such program modules 525 include, but are not limited to: an operating system, one or more applications, other program modules, and program data, and each of these examples, or some combination thereof, may include an implementation of a networked environment.

The bus 530 may be one or more of representing several types of bus structures, including a storage unit bus or a storage unit controller, a peripheral bus, a graphics acceleration pert, a processing unit or a local area bus using any of a plurality of bus structures.

The electronic equipment 500 may also communicate with one or more external equipment 700 (for example, a keyboard, a pointing device, a Bluetooth device, and the like), may also communicate with one or more equipment that enable a user to interact with that electronic equipment 500, and/or communicate with any device (for example, a router, modem, and the like) that enables the electronic equipment 500 to communicate with one or more other computing equipment. Such communication can be carried out via an input/output (I/O) interface 550, for example with a display unit 540. And the electronic equipment 500 may also communicate with one or more networks (for example, a local area network (LAN), a wide area network (WAN), and/or a public network, such as the Internet) via a network adapter 560. As shown, the network adapter 560 communicates with other modules of the electronic equipment 500 via the bus 530. It should be appreciated that, although not shown in the figures, other hardware and/or software modules may be used, in conjunction with the electronic equipment 500, including, but not limited to: microcode, device drives, redundant processing units, external disk drive arrays, RAID systems, tape drives, and data backup storage systems, and the like.

By the above description of the embodiments, it is readily understood by those skilled in the art that the example embodiments described herein may be realized by software or may also be realized in a way of software in combination with the necessary hardware. Therefore, the technical solutions according to the embodiments, of the present disclosure may be embodied in the form of a software product, and the software product may be stored in a non-volatile storage medium (which may be a CD-ROM, a USB flash drive, a removable hard disk, and the like) or on a network, and includes a number of instructions to cause a computing device (which may be a personal computer, a server, a terminal device, or a networked device, the like) to execute the method according to, embodiments of the present disclosure.

According, to a fourth aspect of the present disclosure, there is further provided a computer-readable storage medium having stored thereon a program product capable of implementing the method described above in the present specification. In some possible implementations, the respective aspects of the present invention may also be realized in the form of a program, product including program code which, when the program product runs on a terminal device, is configured to cause the terminal device to execute the steps according to various exemplary embodiments of the present Invention as described in the above-described “Exemplary Methods” section of the present specification.

Figure 6:
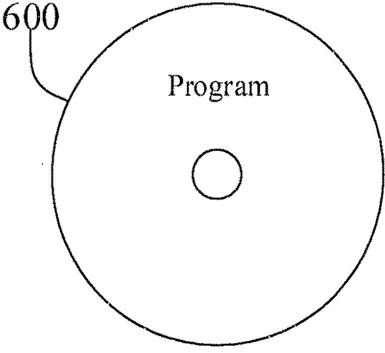
FIG. 6 is a computer program product implementing the above-described logging image definition recognition method illustrated according to an exemplary embodiment.

Referring to FIG. 6, a computer program product 600 for implementing the above-described, method according to an implementation of the present invention is depicted, which may employ a portable compact disk read-only memory (CD-ROM) and include program code, and may be run on a terminal device, such as a personal computer. However, the computer program product of the present invention is not limited to this. In the present document, a readable storage medium may be any tangible medium that contains or stores a program that can be used by, or in combination with, an instruction execution system, apparatus, or device.

The computer program product may employ any combination of one or more readable media. The readable medium may be a readable signal medium or a readable storage medium. The readable storage medium may, for example, be, but is not limited to, a system, apparatus, or device that is electrical, magnetic, optical, electromagnetic, infrared, or semiconducting, or a combination of any of the above. More specific examples of the readable storage medium (a non-exhaustive list) include: an electrical connection having one or more wires, a portable disk, a hard disk, a random access memory (RAM), a read-only memory (ROM), an erasable programmable read-only memory (EPROM or flash memory), a fiber optic, a portable compact disk, read-only memory (CD-ROM), an optical storage device, a magnetic-storage device, or any suitable combination of the foregoing.

A computer-readable signal medium may include a data signal propagated in a baseband as part of a carrier, which-carries readable program codes. Such propagated data signals, may employ a variety of forms, including, but not limited to, electromagnetic signals, optical sign, or any suitable combination of the foregoing. The readable signal medium may also be any readable medium other than, a readable storage medium, that can send, disseminate, or transmit a program for use by, or in combination with, an instruction execution system, apparatus, or device.

The program code contained on the readable medium may be transmitted using any suitable medium, including, but not limited to, wireless, wired, fiber optic cable, RF, and the like, or any suitable combination of the foregoing.

Program code for executing the operations, of the invention may be written in any combination of one or more programming languages, and the programming languages include object-oriented programming languages—such as, Java, C++, and the like—as well as conventional, procedural programming languages—such as the "C" language or similar programming languages. The program code may be executed entirely on the user computing device, partially on the user device, as a stand-alone software package, partially on the user computing device and partially on a remote computing device, or entirely on a remote computing device or server. In situations involving remote computing devices, the remote computing device may be connected to the user computing device via any kind of network, including a local area network (LAN) or a wide area network (WAN), or may be connected to an external computing device (for example by utilizing an Internet service provider to connect via the Internet).

Furthermore, the above-described accompanying drawings are only schematic illustrations of the processing included in the method according to exemplary embodiments of the present invention and are not intended to be limiting. It is readily understood that the processing shown in the above-described accompanying drawings does not indicate or limit the chronological order of such processing. In addition, it is also readily understood that these processes may be executed, for example, synchronously or asynchronously in a plurality of modules.

It should be understood that the present invention is not limited to the precise structure which has been described above and illustrated in the accompanying drawings, and that various modifications and alterations may be performed without departing from its scope. The scope of the invention is limited only by the appended claims.

What is claimed is:

1. A logging image definition recognition method, comprising:

establishing a logging image sample library comprising a plurality of logging images;

acquiring actual definition information corresponding to the respective logging images, the actual definition information being an actual definition sorting sequence number or an actual normalized definition;

acquiring a plurality of definitions corresponding to the respective logging images, the plurality of definitions being generated by a plurality of target image definition determination algorithms respectively performing definition calculations on the logging images;

determining target weights corresponding to the respective target image definition determination algorithms according to the plurality of definitions and the actual definition information corresponding to the respective logging images; and determining a definition of a target logging image by the respective target image definition determination algorithms and the target weights corresponding to the respective target image definition determination algorithms.

2. The method according to claim 1, wherein the determining the target weights corresponding to the respective target image definition determination algorithms according to the plurality of definitions and the actual definition information corresponding to the respective logging images comprises:

establishing definition vectors corresponding to the respective logging images by the plurality of definitions corresponding to the respective logging images, the definition vectors comprising normalized definitions corresponding to the respective target image definition determination algorithms;

initializing a weight vector, the weight vector comprising weights corresponding to the respective target image definition determination algorithms;

constructing a plurality of training units by the weight vector and the definition vectors corresponding to the respective logging images, each of the training units comprising definition vectors corresponding to two logging images respectively and the weight vector;

executing a weight adjustment step, the weight adjustment step comprising: for each of the training units, comparing elements in the definition vectors in each of the training units, and adjusting weights of the weight vector in the training units according to the comparison results;

determining an average of the weight vectors in the respective training units to obtain a final weight vector;

calculating and obtaining final definitions corresponding to the respective logging images by the final weight vector and the definition vectors corresponding to the respective logging images;

determining whether the final definitions corresponding to the respective logging images match the actual definition information corresponding to the respective logging images;

if yes, utilizing the weights in the final weight vector as the target weights corresponding to the respective target image definition determination algorithms, otherwise executing the weight adjustment step and subsequent steps until the final definitions corresponding to the respective logging images match the actual definition information corresponding to the respective logging images.

3. The method according to claim 2, wherein the training units comprise a first definition vector and a second definition vector, the weight adjustment step further comprises:

if a number, in which elements in the first definition vector are greater than corresponding elements in the second definition vector, is more than half of a total number of elements in the first definition vector or the second definition vector, then increasing the respective target weights in the weight vector or decreasing respective non-target weights in the weight vector, until the sum of the products of the weight vector and corresponding elements in the first definition vector is greater than the sum of the products of the weight vector and corresponding elements in the second definition vector, wherein the elements in the first definition vector that are larger than the corresponding elements of the second definition vector correspond to the target image definition determination algorithms corresponding to the target weights, and the non-target weights are weights in the weight vector other than the target weights.

4. The method according to claim 3, wherein the establishing the logging image sample library comprising the plurality of logging images comprises:

acquiring unrepaired logging images and repaired logging images corresponding to the respective unrepaired logging images;

establishing the logging image sample library by the unrepaired logging images and the repaired logging images.

5. The method according to claim 2, wherein the actual definition information is an actual definition sorting sequence number, and the determining whether the final definitions corresponding to the respective logging images match the actual definition information corresponding to the respective logging images comprises:

sorting the final definitions corresponding to the respective logging images to obtain a final definition sorting sequence numbers corresponding to the respective logging images;

if, for any logging image, the final definition sorting sequence number corresponding to that logging image is consistent with the actual definition sorting sequence number corresponding to that logging image, then determining that the final definitions corresponding to the respective logging images match the actual definition information corresponding to the respective logging images, otherwise determining that the final definitions corresponding to the respective logging images do not match the actual definition information corresponding to the respective logging images.

6. The method according to claim 5, wherein before acquiring the plurality of definitions corresponding to the respective logging images, the method further comprises:

for each logging image in the logging image sample library, respectively determining definitions of that logging image by a plurality of image definition determination algorithms;

selecting a plurality of target image definition determination algorithms among the plurality of image definition determination algorithms according to the definitions determined by a plurality of image definition determination algorithms and the actual definition sorting sequence numbers corresponding to the respective logging images.

7. The method according to claim 6, wherein the establishing the logging image sample library comprising the plurality of logging images comprises:

acquiring unrepaired logging images and repaired logging images corresponding to the respective unrepaired logging images;

establishing the logging image sample library by the unrepaired logging images and the repaired logging images.

8. The method according to claim 5, wherein the establishing the logging image sample library comprising the plurality of logging images comprises:

acquiring unrepaired logging images and repaired logging images corresponding to the respective unrepaired logging images;

establishing the logging image sample library by the unrepaired logging images and the repaired logging images.

9. The method according to claim 2, wherein the establishing the logging image sample library comprising the plurality of logging images comprises:

acquiring unrepaired logging images and repaired logging images corresponding to the respective unrepaired logging images;

establishing the logging image sample library by the unrepaired logging images and the repaired logging images.

10. The method according to claim 2, wherein the plurality of target image definition determination algorithms comprise one or more of the following algorithms: a Brenner algorithm, a Tenengrad algorithm, a Laplacian algorithm, an SMD algorithm, an SMD2 algorithm, a variance algorithm, an energy algorithm, a Vollath algorithm.

11. The method according to claim 1, wherein the establishing the logging image sample library comprising the plurality of logging images comprises:

acquiring unrepaired logging images and repaired logging images corresponding to the respective unrepaired logging images;

establishing the logging image sample library by the unrepaired logging images and the repaired logging images.

12. The method according to claim 1, wherein the plurality of target image definition determination algorithms comprise one or more of the following algorithms: a Brenner algorithm, a Tenengrad algorithm, a Laplacian algorithm, an SMD algorithm, an SMD2 algorithm, a variance algorithm, an energy algorithm, a Vollath algorithm.

13. An electronic equipment, wherein the electronic equipment comprises:

at least one processor;

a memory, on which computer-readable instructions are stored, the computer-readable instructions, when executed by the processor, cause the at least one processor to perform operations, the operations comprising:

establishing a logging image sample library comprising a plurality of logging images;

acquiring actual definition information corresponding to the respective logging images, the actual definition information being an actual definition sorting sequence number or an actual normalized definition;

acquiring a plurality of definitions corresponding to the respective logging images, the plurality of definitions being generated by a plurality of target image definition determination algorithms respectively performing definition calculations on the logging images;

determining target weights corresponding to the respective target image definition determination algorithms according to the plurality of definitions and the actual definition information corresponding to the respective logging images; and determining a definition of a target logging image by the respective target image definition determination algorithms and the target weights corresponding to the respective target image definition determination algorithms.

14. The electronic equipment according to claim 13, wherein the determining the target weights corresponding to the respective target image definition determination algorithms according to the plurality of definitions and the actual definition information corresponding to the respective logging images comprises:

establishing definition vectors corresponding to the respective logging images by the plurality of definitions corresponding to the respective logging images, the definition vectors comprising normalized definitions corresponding to the respective target image definition determination algorithms;

initializing a weight vector, the weight vector comprising weights corresponding to the respective target image definition determination algorithms;

constructing a plurality of training units by the weight vector and the definition vectors corresponding to the respective logging images, each of the training units comprising definition vectors corresponding to two logging images respectively and the weight vector;

executing a weight adjustment step, the weight adjustment step comprising: for each of the training units, comparing elements in the definition vectors in each of the training units, and adjusting weights of the weight vector in the training units according to the comparison results;

determining an average of the weight vectors in the respective training units to obtain a final weight vector;

calculating and obtaining final definitions corresponding to the respective logging images by the final weight vector and the definition vectors corresponding to the respective logging images;

determining whether the final definitions corresponding to the respective logging images match the actual definition information corresponding to the respective logging images;

if yes, utilizing the weights in the final weight vector as the target weights corresponding to the respective target image definition determination algorithms, otherwise executing the weight adjustment step and subsequent steps until the final definitions corresponding to the respective logging images match the actual definition information corresponding to the respective logging images.

15. The electronic equipment according to claim 14, wherein the training units comprise a first definition vector and a second definition vector, the weight adjustment step further comprises:

if a number, in which elements in the first definition vector are greater than corresponding elements in the second definition vector, is more than half of a total number of elements in the first definition vector or the second definition vector, then increasing the respective target weights in the weight vector or decreasing respective non-target weights in the weight vector, until the sum of the products of the weight vector and corresponding elements in the first definition vector is greater than the sum of the products of the weight vector and corresponding elements in the second definition vector, wherein the elements in the first definition vector that are larger than the corresponding elements of the second definition vector correspond to the target image definition determination algorithms corresponding to the target weights, and the non-target weights are weights in the weight vector other than the target weights.

16. The electronic equipment according to claim 14, wherein the actual definition information is an actual definition sorting sequence number, and the determining whether the final definitions corresponding to the respective logging images match the actual definition information corresponding to the respective logging images comprises:

sorting the final definitions corresponding to the respective logging images to obtain a final definition sorting sequence numbers corresponding to the respective logging images;

if, for any logging image, the final definition sorting sequence number corresponding to that logging image is consistent with the actual definition sorting sequence number corresponding to that logging image, then determining that the final definitions corresponding to the respective logging images match the actual definition information corresponding to the respective logging images, otherwise determining that the final definitions corresponding to the respective logging images do not match the actual definition information corresponding to the respective logging images.

17. The electronic equipment according to claim 16, wherein before acquiring the plurality of definitions corresponding to the respective logging images, the method further comprises:

for each logging image in the logging image sample library, respectively determining definitions of that logging image by a plurality of image definition determination algorithms;

selecting a plurality of target image definition determination algorithms among the plurality of image definition determination algorithms according to the definitions determined by a plurality of image definition determination algorithms and the actual definition sorting sequence numbers corresponding to the respective logging images.

18. The electronic equipment according to claim 13, wherein the establishing the logging image sample library comprising the plurality of logging images comprises:

acquiring unrepaired logging images and repaired logging images corresponding to the respective unrepaired logging images;

establishing the logging image sample library by the unrepaired logging images and the repaired logging images.

19. The electronic equipment according to claim 13, wherein the plurality of target image definition determination algorithms comprise one or more of the following algorithms: a Brenner algorithm, a Tenengrad algorithm, a Laplacian algorithm, an SMD algorithm, an SMD2 algorithm, a variance algorithm, an energy algorithm, a Vollath algorithm.

20. A non-volatile computer-readable storage medium, in which at least one executable instruction is stored, the executable instruction being configured to cause a processor to perform operations of:

establishing a logging image sample library comprising a plurality of logging images;

acquiring actual definition information corresponding to the respective logging images, the actual definition information being an actual definition sorting sequence number or an actual normalized definition;

acquiring a plurality of definitions corresponding to the respective logging images, the plurality of definitions being generated by a plurality of target image definition determination algorithms respectively performing definition calculations on the logging images;

determining target weights corresponding to the respective target image definition determination algorithms according to the plurality of definitions and the actual definition information corresponding to the respective logging images; and determining a definition of a target logging image by the respective target image definition determination algorithms and the target weights corresponding to the respective target image definition determination algorithms.

* * * * *